United States Patent [19]

Gordon

[11] 3,865,887
[45] Feb. 11, 1975

[54] PROCESS FOR REMOVING LOWER ALKYL CHLORIDES FROM VINYL CHLORIDE MONOMERS

[75] Inventor: Ronnie D. Gordon, Richardson, Tex.

[73] Assignee: Continental Oil Company, Ponca City, Okla.

[22] Filed: June 21, 1972

[21] Appl. No.: 265,073

[52] U.S. Cl. ............................................. 260/656 R
[51] Int. Cl. ............................................. C07c 21/02
[58] Field of Search ................................. 260/656 R

[56] References Cited
UNITED STATES PATENTS

| 2,875,255 | 2/1959 | Eberly | 260/656 |
| 3,125,609 | 3/1964 | Montgomery | 260/656 |

FOREIGN PATENTS OR APPLICATIONS

| 203,516 | 4/1956 | Australia | 260/656 |
| 791,792 | 4/1956 | Great Britain | 260/656 |

Primary Examiner—Leon Zitver
Assistant Examiner—A. Siegel
Attorney, Agent, or Firm—Ronald J. Carlson

[57] ABSTRACT

Lower alkyl chlorides such as methyl chloride may be removed from vinyl chloride by contacting the crude vinyl chloride with a specified purification agent at elevated temperatures.

7 Claims, No Drawings

PROCESS FOR REMOVING LOWER ALKYL CHLORIDES FROM VINYL CHLORIDE MONOMERS

This invention relates to a process for purification of vinyl chloride monomer and, specifically, to a process for removing minor amounts of lower alkyl chlorides from vinyl chloride monomer.

As is well-known in the art, vinyl chloride can be produced by pyrolysis of 1,2-dichloroethane. In the pyrolysis process, minor amounts of by-products are produced which should be substantially removed since, as indicated in U.S. Pat. No. 3,222,407, process efficiency in polymerization of the vinyl chloride monomer is hampered by their presence. It is recognized in the art that one of the impurities in vinyl chloride monomer derived from pyrolysis of 1,2-dichloroethane is methyl chloride and that conventional purification means do not sufficiently remove the impurity to the level called for in commercial specifications. As a result, various efforts have heretofore been made to reduce the level of this impurity in the vinyl chloride monomer. For example, in U.S. Pat. No. 3,222,407, a technique is disclosed wherein dichloroethane is pyrolyzed in the presence of chlorine and carbon tetrachloride to reduce the methyl chloride content of the effluent product stream containing the vinyl chloride monomer.

In accordance with this invention, another approach has been discovered for reducing the level of methyl chloride, and for that matter any lower alkyl chloride, from vinyl chloride monomer containing such impurities. Briefly described, in the process of this invention involves contacting the vinyl chloride monomer containing minor amounts of lower alkyl chlorides with a specified purification agent at elevated temperatures. The purification agents suitable for use in the invention are metal oxides supported on alumina wherein the metal is a Group IVB, VB, VIB, VIIB, or VIII metal; bismuth oxide supported on alumina; copper sulfate supported on alumina; cobalt chloride supported on alumina; thorium oxide supported on alumina; magnesium oxide; or alumina, either in its pure activated form or as bauxite. For the most part, these purification agents are available on a commercial basis. However, it the case of the alumina-supported materials, the purification agents may be readily prepared by saturating the alumina support with a solution, aqueous or otherwise, of the metal oxide derived from a metal of Group IVB, VB, VIB, VIIB, or VIII; bismuth oxide; copper sulfate; cobalt chloride; or thorium oxide; followed by drying the impregnated alumina support by ordinary evaporative techniques. It is not necessarily essential to remove all traces of moisture from the purification agents and it is thought that some moisture may be desirable although the amounts should not exceed about 1 weight percent.

The removal of the methyl chloride from the vinyl chloride may be accomplished by passing the crude vinyl chloride in a liquid or vapor state through a fixed or fluidized bed of the purification agent at an elevated temperature. In general, temperatures in the range of about 75°C to 300°C are suitable preferably from about 100°C to 200°C. While the pressure is not critical to the process of this invention, sufficient pressure must be maintained to keep the vinyl chloride in a liquid state in the event the process is operated on a liquid basis. However, it is preferred that the vinyl chloride be in the vapor phase rather than the liquid phase. Convenient pressures to operate the process may range from about atmospheric up to about 150 psi.

The contact time between the crude vinyl chloride and the purification agent may vary over a wide range and will depend to some extent on the particular temperatures employed. In general, the lower temperatures will require somewhat longer contact time. Any contact time suitable to effect methyl chloride removal at the conditions employed may be used. Of course, the contact time may be readily adusted by regulating the flow rate of the crude vinyl chloride through the purification agent to achieve a satisfactory removal of methyl chloride as is known in the art.

The following examples will serve to further illustrate the process of this invention as described above.

EXAMPLE 1

A glass tube reactor (25 cm × 2.5 cm) was packed with bauxite (Porocel) as a purification material in a 11 ml volume midway along its length with the remaining volumes at each end being packed with glass beads. The reactor was then heated to 100°C by means of a flexible heating tape whereupon an autogenous pressure of about 150 psig was achieved. Crude vinyl chloride containing about 60 ppm methyl chloride was then passed through the reactor in a vapor state at an increasing rate to about 17 g/min. At this rate a sample of the condensed effluent gases from the reactor was analyzed by gas chromatography and found to contain less than 5 ppm methyl chloride representing a decrease of over 90% of the original methyl chloride concentration in the vinyl chloride.

EXAMPLE 2

A glass tube reactor like that described in Example 1 was packed with copper sulfate on alumina in a 11 ml volume midway along the length of the reactor with glass beads being packed into the remaining end volumes. The copper sulfate on alumina was prepared by dissolving 6 g of $CuSO_4 \cdot 5 H_2O$ in 200 ml methanol and adding this to 20 g of ¼ × ⅛ inch alumina pellets. After soaking overnight and draining off the excess solution, the pellets were dried for 20 hours at 100°C under vacuum. The reactor was heated to 100°C and an autogenous pressure of 150 psig, and crude vinyl chloride containing about 60 ppm methyl chloride was passed therethrough at an increasing rate up to about 17 g/min. At this rate, a sample of the condensed effluent gases from the reactor was analyzed by gas chromatography and found to contain less than about 2 ppm methyl chloride, a decrease of over 95% from the original methyl chloride concentration.

EXAMPLE 3

A glass tube reactor as described in Example 1 was charged with a commercial $MoO_3$ on alumina (Nalco - 13% $MoO_3$) in a 11 ml volume midway along the length of the reactor with the remaining volumes at each end being charged with glass beads. The reactor was heated to 50°C under autogenous pressure and crude vinyl chloride containing about 60 ppm methyl chloride was passed therethrough at an increasing rate to about 17 g/min. A sample of the condensed effluent gases from the reactor was analyzed by gas chromatography for methyl chloride content. This procedure was then repeated at 100°C, 120°C, 135°C, 150°C and 200°C. The results are shown in TABLE I.

EXAMPLE 4

The procedure of Example 3 was repeated except that the $MoO_3$ on alumina was titrated to a phenolphthalein end point with aqueous NaOH, dried and then charged to the reactor. An additional sample was also taken at 130°C. The results are shown in TABLE I.

fication agents employed in this invention for comparative purposes. The results are indicated in TABLE IV.

TABLE IV

| Purification Agent | Temp. (°C) | Methyl Chloride (ppm) |
|---|---|---|
| ZnO | 150 | 65–70 |
| $CoCl_2$/Charcoal | 150 | 65–70 |
| $CoCl_2$/Silica-Alumina | 150 | 65–70 |

TABLE I

| Example | Methyl Chloride Content in Effluent Gas (ppm) | | | | | | |
|---|---|---|---|---|---|---|---|
| | 50°C | 100°C | 120°C | 130°C | 135°C | 150°C | 200°C |
| 3 | 60 | 40 | 20 | — | 5 | 2 | 7* |
| 4 | 60 | 45 | 36 | 24 | 4 | 22 | — |

*The analysis indicated several other impurities other than methyl chloride and are represented by this number.

EXAMPLE 5

The procedure described in Example 1 was repeated for a number of purification agents at various temperatures. The results of these tests appear in TABLE II.

TABLE II

| Purification Agent | Temp. (°C) | Methyl Chloride (ppm) |
|---|---|---|
| $Al_2O_3$ | 150 | 30 |
| $MoO_3/Al_2O_3$ (Girdler) | 100 | 60 |
| $MoO_3/Al_2O_3$ (Girdler) | 150 | 50 |
| $MoO_3/Al_2O_3$ (Nalco) | 125 | 10 |
| $ThO_2/Al_2O_3$ | 100 | 30 |
| $ThO_2/Al_2O_3$ | 150 | 4 max. |
| $Bi_2O_3/Al_2O_3$ | 100 | 15 |
| $WO_3/Al_2O_3$ | 100 | 60 |
| $WO_3/Al_2O_3$ | 125 | 50 |
| $WO_3/Al_2O_3$ | 150 | 10 |
| $MoO_3$-$CoO/Al_2O_3$ | 100 | 60 |
| $MoO_3$-$CoO/Al_2O_3$ | 125 | 30 |
| $MoO_3$-$CoO/Al_2O_3$ | 150 | 2 max. |

EXAMPLE 6

The procedure described in Example 1 was again repeated using various purification agents. The crude vinyl chloride contained 65–70 ppm methyl chloride. The results are indicated in TABLE III.

TABLE III

| Purification Agent | Temp. (°C) | Methyl Chloride (ppm) |
|---|---|---|
| $MoO_3/Al_2O_3$ (Girdler) | 150 | 45–50 |
| $MoO_3/Al_2O_3$ (Nalco) | 150 | 10 |
| $Bi_2O_3/Al_2O_3$ | 150 | 5–10 |
| $Al_2O_3$ | 150 | 30 |
| $WO_3/Al_2O_3$ | 150 | 10 |
| $ThO_2/Al_2O_3$ | 150 | 5 |
| $CuSO_4/Al_2O_3$ | 150 | 5 |
| $MoO_3$-$CoO/Al_2O_3$ (Nalco) | 150 | 0–2 |
| $MoO_3$-$CoO/Al_2O_3$ (Grace) | 150 | 5 |
| $CoCl_2/Al_2O_3$ | 150 | 15–20 |

EXAMPLE 7

The procedure described in Example 6 was repeated with several other materials closely related to the puri-

EXAMPLE 8

Following the procedure of Example 1, reduction in methyl chloride of vinyl chloride may be achieved with $TiO_2/Al_2O_3$, $Cr_2O_3/Al_2O_3$, $CrO_2/Al_2O_3$, $CrO_3/Al_2O_3$, $MnO/Al_2O_3$, $MnO_2/Al_2O_3$, $V_2O_3/Al_2O_3$, $V_2O_5/Al_2O_3$, $NiO/Al_2O_3$, $FeO/Al_2O_3$, $Fe_2O_3/Al_2O_3$, $Pd_2O/Al_2O_3$, $PdO/Al_2O_3$, and $PtO_2/Al_2O_3$.

Thus, having described the invention in detail, it will be understood by those skilled in the art that certain variations and modifications may be made without departing from the spirit and scope of the invention as described herein and in the appended claims.

I claim:

1. A process for purifying crude vinyl chloride containing lower alkyl chloride derived from pyrolysis of 1,2-dichloroethane which comprises removing said lower alkyl chloride by passing said crude vinyl chloride at elevated temperatures in the range of about 75°C to about 300°C through a bed of a purification agent selected from the group consisting of metal oxides supported on alumina wherein the metal is a Group IVB, VB, VIB, VIIB or VIII metal; bismuth oxide supported on alumina; copper sulfate supported on alumina; cobalt chloride supported on alumina; thorium oxide supported on alumina; magnesium oxide; and alumina.

2. A process according to claim 1 wherein the lower alkyl chloride is methyl chloride.

3. A process according to claim 1 wherein the temperatures are in the range of about 100°C to about 200°C.

4. A process according to claim 1 wherein the crude vinyl chloride is contacted in the vapor phase with the purification agent.

5. A process according to claim 1 wherein the purification agent is alumina, $MoO_3/Al_2O_3$, $ThO_2/Al_2O_3$, $Bi_2O_3/Al_2O_3$, $WO_3/Al_2O_3$, $MoO_3$-$CoO/Al_2O_3$, $CuSO_4/Al_2O_3$ or $CoCl_2/Al_2O_3$.

6. A process according to claim 5 wherein the alumina is the purification agent.

7. A process according to claim 6 wherein the alumina is in the form of bauxite.

* * * * *